(12) United States Patent
Bartfai-Walcott et al.

(10) Patent No.: US 8,745,233 B2
(45) Date of Patent: Jun. 3, 2014

(54) MANAGEMENT OF SERVICE APPLICATION MIGRATION IN A NETWORKED COMPUTING ENVIRONMENT

(75) Inventors: Katalin Klara Bartfai-Walcott, El Dorado Hills, CA (US); Gregory Jensen Boss, Saginaw, MI (US); Christopher James Dawson, Arlington, VA (US); Rick Allen Hamilton, II, Charlottesville, VA (US)

(73) Assignee: International Business Machines Corporation, Armonk, NY (US)

( * ) Notice: Subject to any disclaimer, the term of this patent is extended or adjusted under 35 U.S.C. 154(b) by 329 days.

(21) Appl. No.: 12/967,145

(22) Filed: Dec. 14, 2010

(65) Prior Publication Data

US 2012/0151061 A1   Jun. 14, 2012

(51) Int. Cl.
*G06F 15/173* (2006.01)

(52) U.S. Cl.
USPC ................ 709/226; 709/224; 709/225; 718/1

(58) Field of Classification Search
None
See application file for complete search history.

(56) References Cited

U.S. PATENT DOCUMENTS

| | | | |
|---|---|---|---|
| 8,112,561 B2 * | 2/2012 | Boutcher et al. | 710/36 |
| 8,150,971 B2 * | 4/2012 | Lublin et al. | 709/226 |
| 8,255,529 B2 * | 8/2012 | Ferris et al. | 709/224 |
| 8,627,123 B2 * | 1/2014 | Jain et al. | 713/310 |
| 2003/0051021 A1 | 3/2003 | Hirschfeld et al. | |
| 2003/0187915 A1 * | 10/2003 | Sun et al. | 709/201 |
| 2006/0020943 A1 * | 1/2006 | Boutcher et al. | 718/104 |
| 2007/0240143 A1 | 10/2007 | Guminy et al. | |
| 2008/0140866 A1 * | 6/2008 | Corry et al. | 710/8 |
| 2008/0270515 A1 | 10/2008 | Chen et al. | |
| 2009/0055550 A1 * | 2/2009 | Way et al. | 709/233 |
| 2009/0204718 A1 | 8/2009 | Lawton et al. | |
| 2009/0228589 A1 * | 9/2009 | Korupolu | 709/226 |
| 2009/0265706 A1 | 10/2009 | Golosovker et al. | |
| 2009/0276771 A1 | 11/2009 | Nickolov et al. | |
| 2009/0300210 A1 | 12/2009 | Ferris | |
| 2010/0071025 A1 * | 3/2010 | Devine et al. | 726/1 |
| 2010/0153674 A1 | 6/2010 | Park et al. | |
| 2010/0223217 A1 * | 9/2010 | Little | 706/19 |
| 2011/0022812 A1 * | 1/2011 | van der Linden et al. | 711/163 |
| 2011/0138381 A1 * | 6/2011 | Hauser | 718/1 |
| 2011/0282975 A1 * | 11/2011 | Carter | 709/220 |
| 2011/0296022 A1 * | 12/2011 | Ferris et al. | 709/226 |

(Continued)

OTHER PUBLICATIONS

Wikipedia. "State (computer science)." Page last modified on Nov. 10, 2010. <http://en.wikipedia.org/wiki/Stateful>.

(Continued)

*Primary Examiner* — Backhean Tiv
(74) *Attorney, Agent, or Firm* — Isaac J. Gooshaw; William E. Schiesser

(57) ABSTRACT

Embodiments of the present invention provide an approach for managing distributed application relationships and dependencies, and migration of applications and components within the same or a disparate networked (e.g. cloud) service provider. An application dependency management program module ("ADM"), and cloud service migration management program module ("CSMM") are provided. The ADM, manually or by deductive logic, discovers and manages relationships and dependencies of computer software applications underlying cloud services, state information of the respective computer software applications, as well as upstream and downstream network data connections. The CSMM comprises ensuring that applications are not migrated or modified in a manner that could affect overall service, ensuring that a migration is performed correctly, maintaining a list of service level requirements for monitoring whether those requirements are being met, and performing application migration.

21 Claims, 8 Drawing Sheets

(56) References Cited

U.S. PATENT DOCUMENTS

| | | | |
|---|---|---|---|
| 2012/0030346 A1* | 2/2012 | Fukuda et al. | 709/224 |
| 2012/0116747 A1* | 5/2012 | Hadar et al. | 703/22 |
| 2012/0131173 A1* | 5/2012 | Ferris et al. | 709/224 |
| 2012/0137003 A1* | 5/2012 | Ferris et al. | 709/226 |
| 2012/0151061 A1* | 6/2012 | Bartfai-Walcott et al. | 709/226 |
| 2013/0110779 A1* | 5/2013 | Taylor et al. | 707/624 |
| 2013/0117240 A1* | 5/2013 | Taylor et al. | 707/690 |

OTHER PUBLICATIONS

Wikipedia. "Quote to cash." Page last modified on Jun. 27, 2009. <http://en.wikipedia.org/wiki/Quote_to_cash>.

* cited by examiner

MANAGEMENT OF SERVICE APPLICATION MIGRATION IN A NETWORKED COMPUTING ENVIRONMENT

TECHNICAL FIELD

The present invention generally relates to networked computing. Specifically, the present invention relates to managing the migration of services and/or applications with interdependencies in a networked (e.g. cloud) computing environment.

BACKGROUND

The cloud computing environment is an enhancement to the predecessor grid environment, whereby multiple grids and other computation resources may be further abstracted by a cloud layer, thus making disparate devices appear to an end-user/consumer as a single pool of seamless resources. These resources may include such things as physical or logical compute engines, servers and devices, device memory, storage devices, etc.

Current methods and systems for managing distributed applications in networked (e.g. cloud) computing environment lack sufficient functionality to fully manage application relationships and dependencies and application migrations of networked computing services and respective distributed applications that make up networked computing services provided by the networked (e.g. cloud) computing environments. Moreover, these current computing systems and methods typically do not leverage application relationships and dependencies to prevent the networked (e.g. cloud) computing environments from performing operations that can cause service level agreement targets to be missed. Further yet, current systems typically do not fully take into account application relationships and dependencies of distributed applications for which some networked computing services have critical and/or short term needs.

SUMMARY

Embodiments of the present invention provide an approach for managing distributed application relationships and dependencies, and application migrations in a networked (e.g. cloud) computing environment, and migrating cloud services and applications without significantly impacting the cloud services' and applications' performance.

A first aspect of the present invention provides a computer implemented method for managing application migration in a networked computing environment, the method comprising the steps of: generating a list of relationships and dependencies for a first networked computing service and one or more current computer software applications that are utilized by the first networked computing service, state information of the one or more current computer software applications, and upstream and downstream network data connections of the first networked computing service; storing the list on an electronic storage device; determining an availability of one or more replacement computer software applications for the one or more current computer software applications that are utilized by the first networked computing service, wherein the one or more replacement computer software applications have substantially identical functionality as that of the one or more computer software applications; and determining an impact on service levels and performance of the first networked computing service that would result from a migration of the one or more current computer software applications from the first networked computing service to a second networked computing service, based upon the list and the availability.

A second aspect of the present invention provides a system for managing application migration in a networked computing environment, the system comprising: a bus; a processor coupled to a bus; a memory medium coupled to the bus, the memory medium comprising instructions to: generate a list of relationships and dependencies for a first networked computing service and one or more current computer software applications that are utilized by the first networked computing service, state information of the one or more current computer software applications, and upstream and downstream network data connections of the first networked computing service; store the list on an electronic storage device; determine an availability of one or more replacement computer software applications for the one or more current computer software applications that are utilized by the first networked computing service, wherein the one or more replacement computer software applications have substantially identical functionality as that of the one or more computer software applications; and determine an impact on service levels and performance of the first networked computing service that would result from a migration of the one or more current computer software applications from the first networked computing service to a second networked computing service, based upon the list and the availability.

A third aspect of the present invention provides a computer program product for managing application migration in a networked computing environment, the computer program product comprising a computer readable storage media, and program instructions stored on the computer readable storage media, to: generate a list of relationships and dependencies for a first networked computing service and one or more current computer software applications that are utilized by the first networked computing service, state information of the one or more current computer software applications, and upstream and downstream network data connections of the first networked computing service; store the list on an electronic storage device; determine an availability of one or more replacement computer software applications for the one or more current computer software applications that are utilized by the first networked computing service, wherein the one or more replacement computer software applications have substantially identical functionality as that of the one or more computer software applications; and determine an impact on service levels and performance of the first networked computing service that would result from a migration of the one or more current computer software applications from the first networked computing service to a second networked computing service, based upon the list and the availability.

A fourth aspect of the present invention provides a method for deploying a system for managing application migration in a networked computing environment, comprising: deploying a computer infrastructure being operable to: generate a list of relationships and dependencies for a first networked computing service and one or more current computer software applications that are utilized by the first networked computing service, state information of the one or more current computer software applications, and upstream and downstream network data connections of the first networked computing service; store the list on an electronic storage device; determine an availability of one or more replacement computer software applications for the one or more current computer software applications that are utilized by the first networked computing service, wherein the one or more replacement computer software applications have substantially identical functionality as that of the one or more computer software applications; and determine an impact on service levels and performance of the first networked computing service that would result from a migration of the one or more current computer software applications from the first networked computing service to a second networked computing service, based upon the list and the availability.

BRIEF DESCRIPTION OF THE DRAWINGS

These and other features of this invention will be more readily understood from the following detailed description of the various aspects of the invention taken in conjunction with the accompanying drawings in which.

Figure 1:
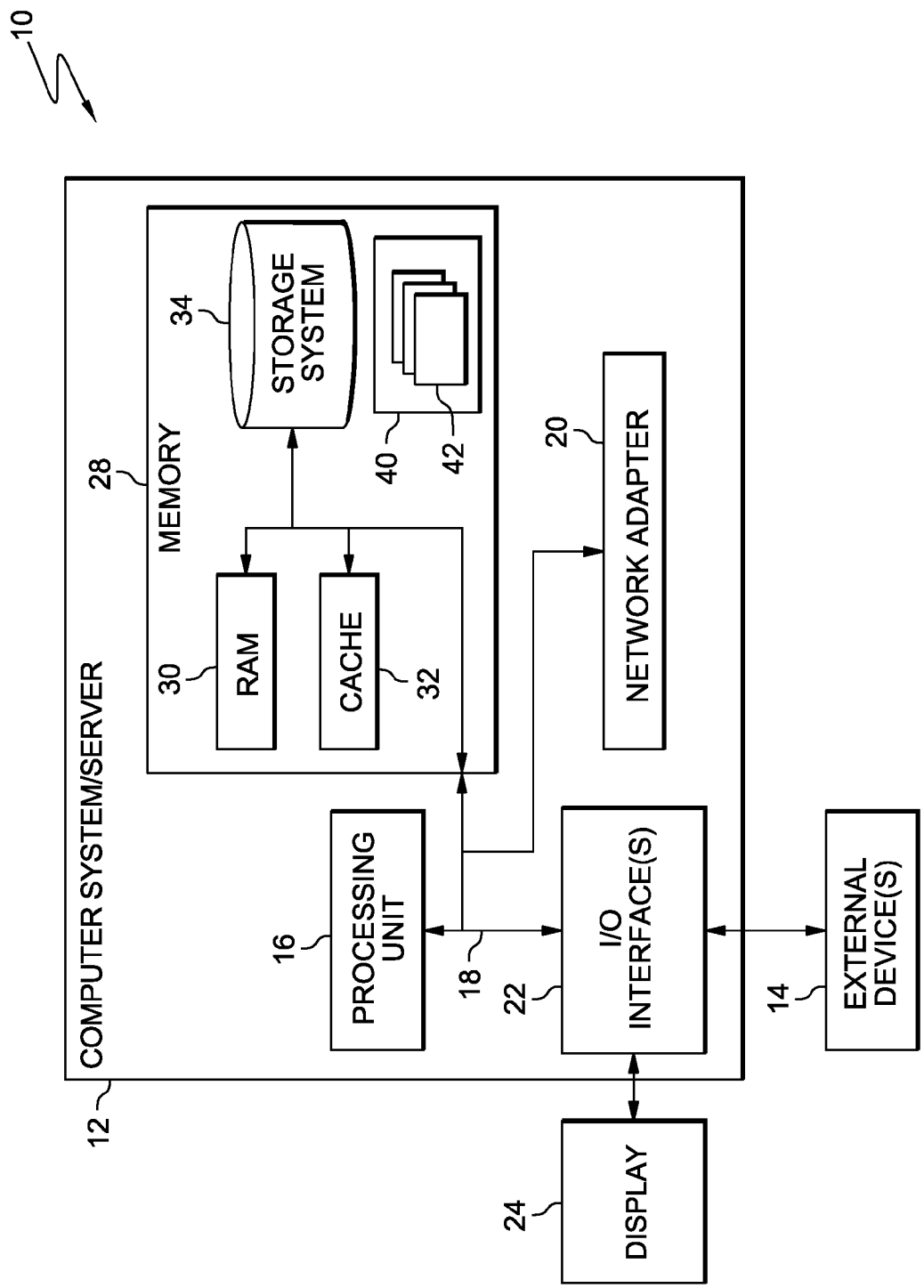
FIG. 1 depicts a distributed (e.g. cloud) computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Exemplary embodiments now will be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention provide an approach for managing distributed (e.g. cloud) application relationships and dependencies, and for the migration of the components which comprise applications, upstream data, downstream data, upstream network data connections, and downstream network data connections. Under embodiments of the present invention, an application dependency management program module and a cloud service migration management program module are provided.

The application dependency management program module provides functionality to generate and manage lists of relationships and dependencies of respective computer software applications underlying cloud services, state information of the respective computer software applications, upstream network data connections from which data is received for a cloud service provider and services within the cloud service provider, and downstream network data connections from which data is sent from the cloud services and out of the cloud service provider infrastructure. The application dependency management program module allows a cloud administrator to discover and manually create an application hierarchy and enter application relationships and dependencies via a computer-based portal in order to generate the list of relationships and dependencies, and/or the list can be generated by a deductive logic method using the application dependency management program module. The list can be updated on a periodic basis, and is used by the application dependency management program module to determine whether a proposed application can be migrated.

The cloud service migration management program module performs migrations of components which are included in applications and cloud services. Data is sent and received between the cloud service migration management program module and the application dependency management program module to ensure that applications are not migrated or modified in a manner that could affect an overall service, ensuring that a migration is performed correctly, and maintaining a list of service level agreements ("SLAs") which can be used for monitoring whether cloud service SLAs and application SLAs are being met. SLAs reflect a consumer's service delivery requirements in a networked (e.g. cloud) computing environment. A consumer having relatively inflexible service delivery requirements may select an SLA having a relatively higher price, whereas a consumer having relatively flexible service delivery requirements may select an SLA having a relatively lower price. Accordingly, a migration management approach is provided which manages interdependencies of applications and cloud services, and migration of the applications and the cloud services within the same cloud provider infrastructure, or to another cloud provider infrastructure.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary computer software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating systems, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user/consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or computer software components could be used in conjunction with computer system/server 12. Examples include, but are not limited to: microcode, device drivers, redundant processing units, external disk drive arrays, RAID systems, tape drives, and data archival storage systems, etc.

Figure 2:
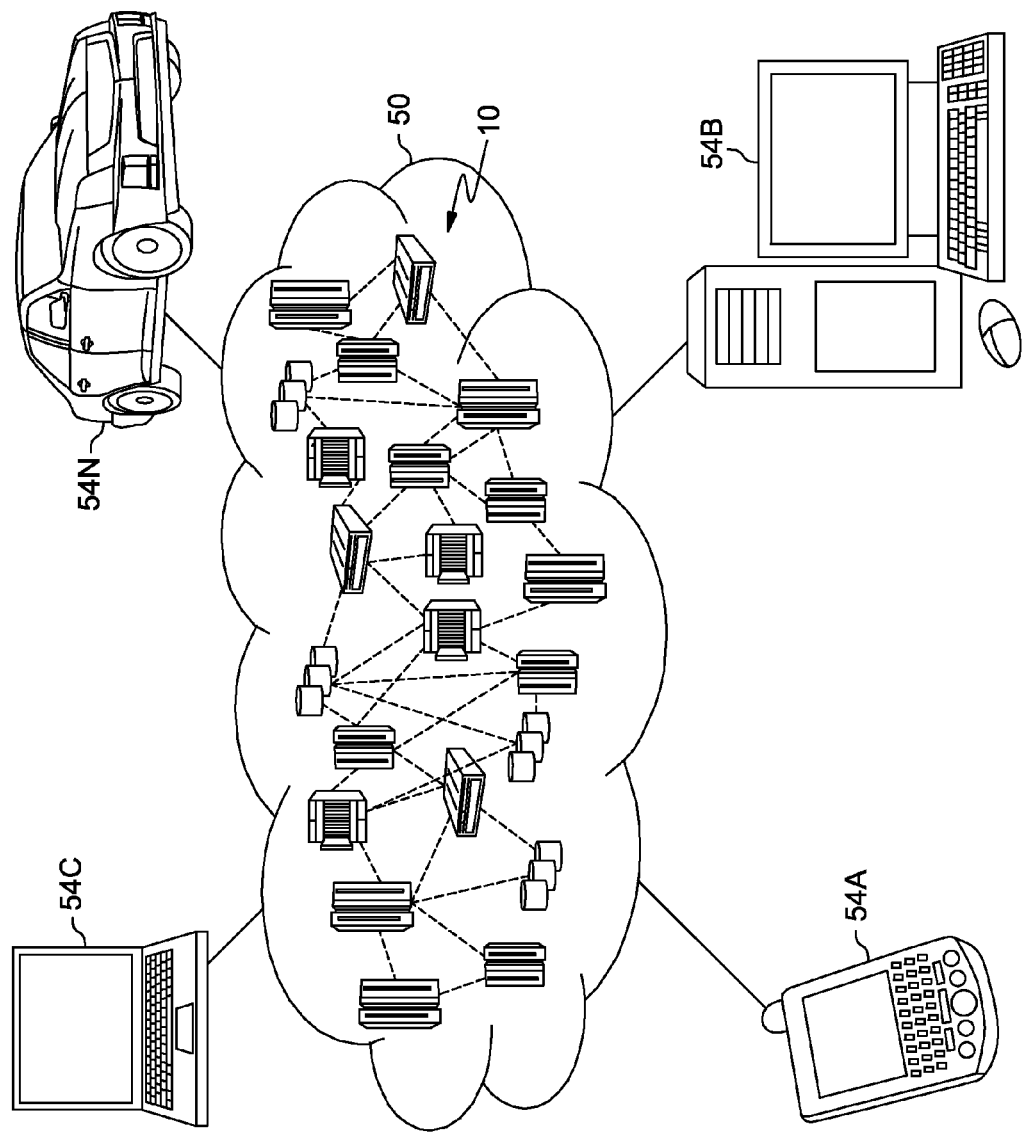
FIG. 2 depicts a distributed (e.g. cloud) computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
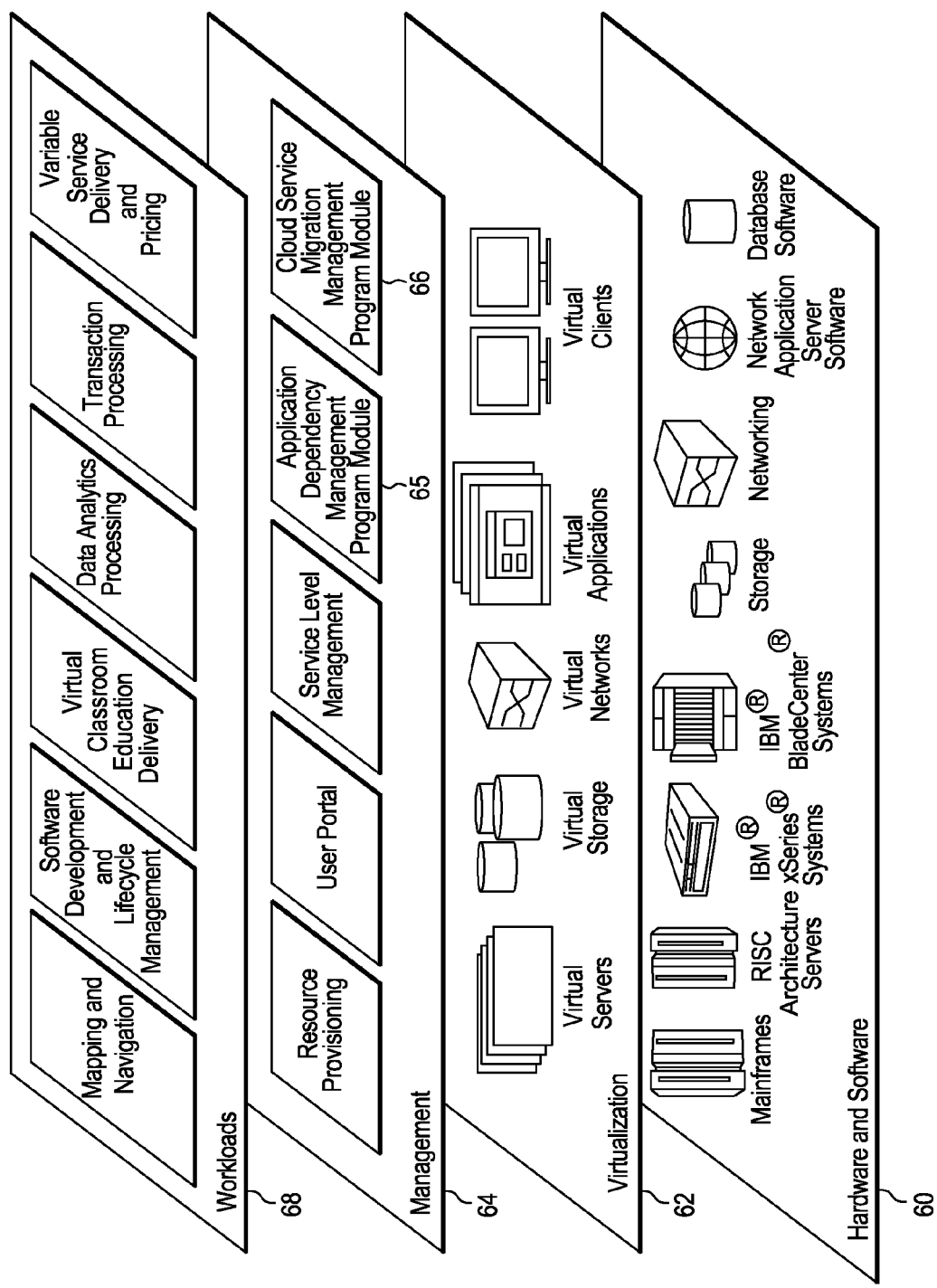
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and computer software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of computer software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

Management layer 64 provides for management of cloud services residing on servers within a cloud computing environment. In one embodiment, management layer 64 may provide the program modules and/or functionalities described below. Resource provisioning provides dynamic procurement of computing resources and other resources that are utilized to perform tasks within the cloud computing environment. User/consumer portal provides access to the cloud computing environment for consumers and system administrators. Service level management provides cloud computing resource allocation and management such that required service levels are met. Application dependency management program module 65 provides functionality for generating and maintaining a list which includes, but is not limited to, the relationships and dependencies of cloud services and their respective applications, application relationships and dependencies, upstream network data connections, and downstream network data connections. Cloud service migration management program module 66 migrates applications and cloud services, and receives data from application dependency management program 65 so as to prevent applications from being moved or modified in a way that could adversely affect cloud services.

It is understood that functions of the present invention as described herein may be performed by the application dependency management program module 65 and/or cloud service migration management program module 66, which can be tangibly embodied as modules of program code 42 (shown in FIG. 1) of program/utility 40 (shown in FIG. 1) residing at the cloud management layer 64. However, this need not be the case. Rather, the functionality recited herein could be carried out/implemented and/or enabled by other layers depicted in FIG. 3, such as workloads layer 68.

Workloads layer 68 provides examples of functionality for which the cloud computing environment may be utilized. In one embodiment workloads and functions which may be provided from this layer include: mapping and navigation; software development and lifecycle management; virtual classroom education delivery; data analytics processing; transaction processing; and variable service delivery and pricing. As mentioned above, all of the foregoing examples described with respect to FIG. 3 are illustrative only, and the invention is not limited to these examples. In addition, workloads and applications are used synonymously.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
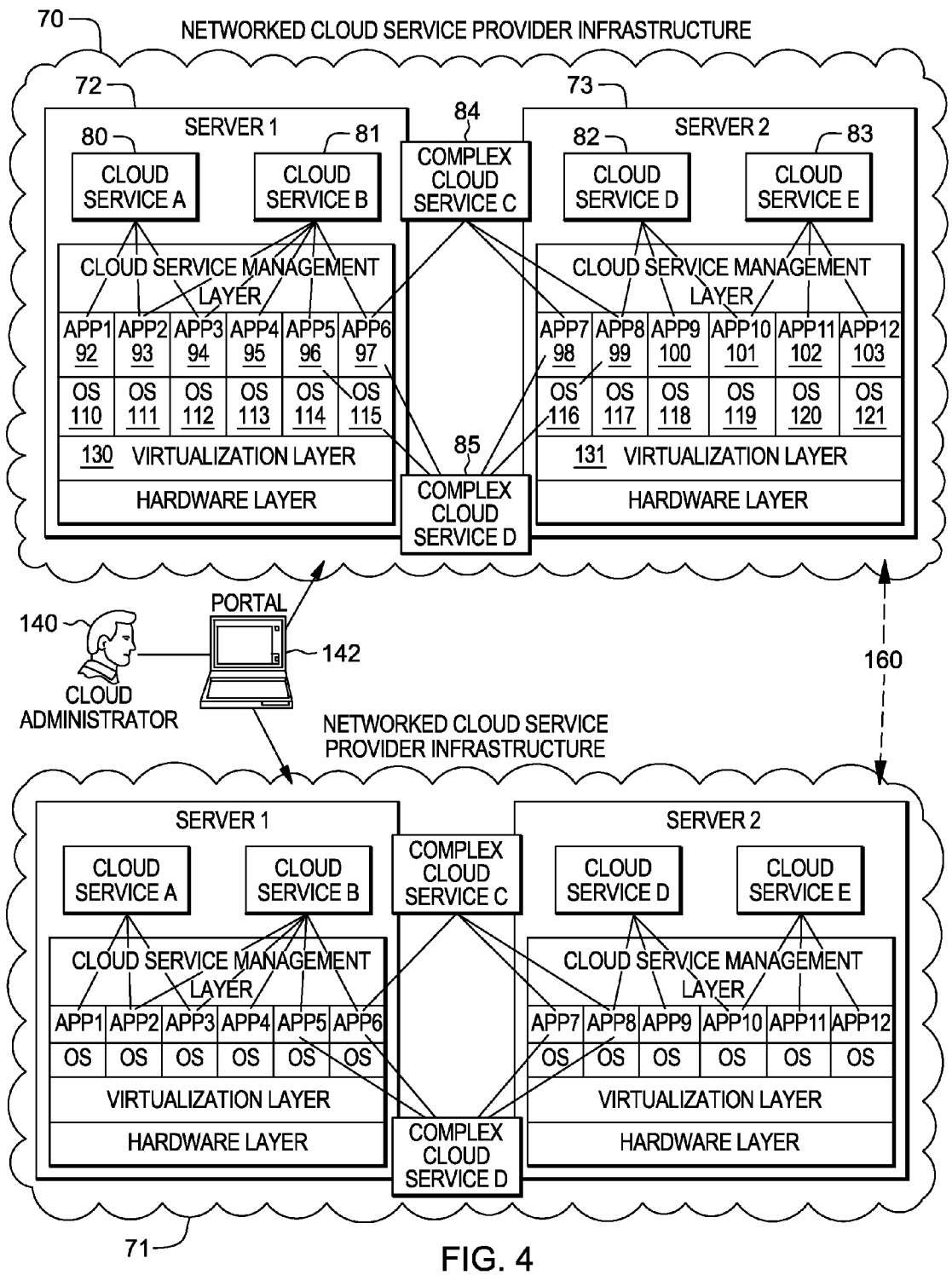
FIG. 4 depicts networked (e.g. cloud) service provider infrastructures.

Referring now to FIG. 4, networked cloud service provider infrastructure 70 of a typical cloud service provider with servers 72 and 73 providing a plurality of simple cloud services 80-81 and 82-83, respectively and complex cloud services 84 and 85 which span across the servers 72 and 73 within networked cloud service provider infrastructure 70. Networked cloud service provider infrastructure 71 includes the same offerings/capabilities as the networked cloud service provider infrastructure 70 but resides at a different virtual or physical location than networked cloud service provider infrastructure 70. Networked cloud service provider infrastructure 71 may also be owned by another business entity than that which owns infrastructure 70. Networked cloud service provider infrastructures 70 and 71 are linked to each other via network connection 160.

The simple cloud services 80-81 and 82-83 span only one cloud server 72 or 73 respectively, but the complex cloud services 84 and 85 span both cloud servers 72 and 73. As depicted, both simple cloud services 80-81 and 82-83 and complex cloud services 84 and 85 may be comprised of a plurality of applications 92-102 and candidate application 103.

Applications 92-102 and candidate application 103 run on respective operating systems 110-121. In addition, applications 92-102 and candidate application 103 can run on the same or different types of respective operating systems 110-121. Applications 92-102 and candidate application 103 can each be fully isolated and encapsulated by way of virtualization layers 130 and 131. Each of the applications 92-102, candidate application 103, and the respective operating systems 110-121 can have their own computer system/server 12 (shown in FIG. 1) which comprises other elements shown in FIG. 1 such as, for example: processing unit 16, memory 28, network adapter 20, and magnetic disk drive.

In one embodiment of the present invention, the services provided by a cloud service provider are implemented on networked cloud service provider infrastructure 70, comprising networks, servers, memory, storage, applications, virtual machines, and other computing and network devices as described hereinabove with reference to FIGS. 1-3. Cloud administrator 140 may monitor and manage application relationships and dependencies, application migrations, and cloud services and resources implemented on networked cloud service provider infrastructures 70 and 71 by utilizing computer-based portal 142. From time to time, cloud administrator 140 may manually define relationships and dependencies of applications 92-102 and candidate application 103 within the virtual layers 130-131. Cloud administrator 140 may also access networked cloud service provider infrastructures 70 and 71 using other network attached devices, or using consoles, or the like, that are locally attached (e.g. directly connected) to the devices which comprise networked cloud service provider infrastructures 70 and 71. The access rights of cloud administrator 140 to networked cloud service provider infrastructures 70 and 71 may be adjusted to meet a service provider's privacy and security requirements.

Moreover, relationships and dependencies of applications 92-102 and candidate application 103 within the virtual layers 130-131 can be generated using a deductive logic method. To carry out the deductive logic method, the application dependency management program module 65 (shown in FIG. 3) can connect to a network monitor to determine data flow. Examples of network monitors are sniffers or packet scanners. Next, as part of the deductive logic method the application dependency management program module 65 captures information which includes the source, destination, and direction and type of network flow with respect to an application being considered for migration. Then, the application dependency management program module 65 can determine relationships and dependencies based on the captured information. It should be understood that the components, layers, and functions shown in FIG. 4 are intended to be illustrative only and embodiments of the invention are not limited thereto.

Figure 5A:
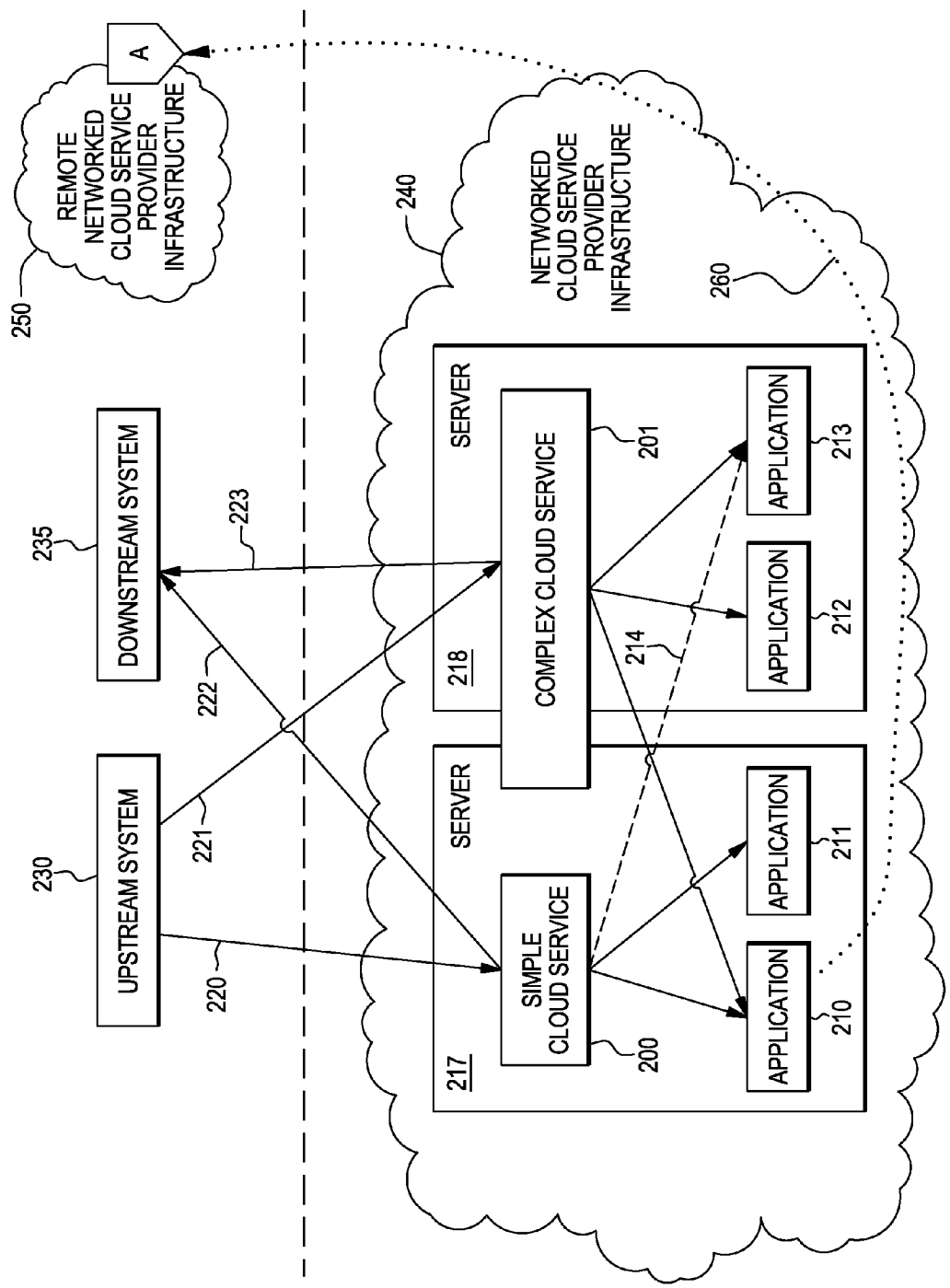
FIGS. 5A and 5B depict an inter-cloud migration of an application from a first networked (e.g. cloud) service provider infrastructure to a second networked (e.g. cloud) service provider infrastructure.

Referring now to FIG. 5A, an embodiment of a networked cloud service provider infrastructure 240 is depicted, wherein a candidate application 211 is migrated in its entirety from local networked cloud service provider infrastructure 240 to remote networked cloud service provider infrastructure 250. Networked cloud service provider infrastructure 240 and remote networked cloud service provider infrastructure 250 may both be owned by a single business entity. The networked cloud service provider infrastructure 240 can have a plurality of simple cloud services and complex cloud services. This embodiment includes a simple cloud service 200 comprised of application 210 and candidate application 211 residing on cloud server 217, and a complex cloud service 201 comprised of application 210 residing on cloud server 217 and applications 212-213 residing on cloud server 218. The simple cloud service 200 can have an upstream network data connection 220 for data output from upstream system 230, and a downstream network data connection 222 for data input to downstream system 235. Also, the complex cloud service 201 can have an upstream network data connection 221 for data output from upstream system 230 and a downstream network data connection 223 for data input to downstream system 235.

Upstream network data connections are any external connections from an upstream system into a networked cloud service provider infrastructure from which data is received for simple cloud services and/or complex cloud services. An example of an upstream system would be a payment gateway to process a credit card transaction. A payment gateway is a cloud service provider that authorizes electronic payments. Downstream network data connections are any external connections from simple cloud services and/or complex cloud services that send data to a downstream system. An example of a downstream network data connection is a reporting application, wherein a cloud service generates data that must be sent to a reporting system.

In the present embodiment simple cloud service 200 utilizes application 210 and candidate application 211 as well as upstream network data connection 220 linked to the upstream system 230. Similarly, complex cloud service 201 utilizes application 210, applications 212-213, as well as upstream network data connection 221 linked to the upstream system 230. In this embodiment, candidate application 211 and application 213 implement substantially the same function. An example of such a function implemented by candidate application 211 and application 213 could be a credit card processing application function. In the present embodiment, candidate application 211 has been identified for migration to remote networked cloud service provider infrastructure 250. Accordingly, it may be possible to substitute application 213 with candidate application 211, by using new network data connection 214 and migrating application 211 via dotted-line path 260. New network data connections are indicated by dashed lines, existing data connections are indicated by solid lines, and migration paths are indicated by dotted-lines. In the event that application 211 is migrated to remote networked cloud service provider infrastructure 250, dotted-line path 260 depicts candidate application 211 being migrated from networked cloud service provider infrastructure 240 to a target application destination within remote networked cloud service provider infrastructure 250, with minimal impact on simple cloud service 200. However, in this embodiment if application 213 is substituted for application 211, then simple cloud service 200 will become a complex cloud service. Minimal impact can be achieved by leveraging the relationships and dependencies that are generated by deductive logic or generated manually by a cloud administrator 140, along with service level requirements to determine whether to migrate the candidate application 211.

Figure 5B:
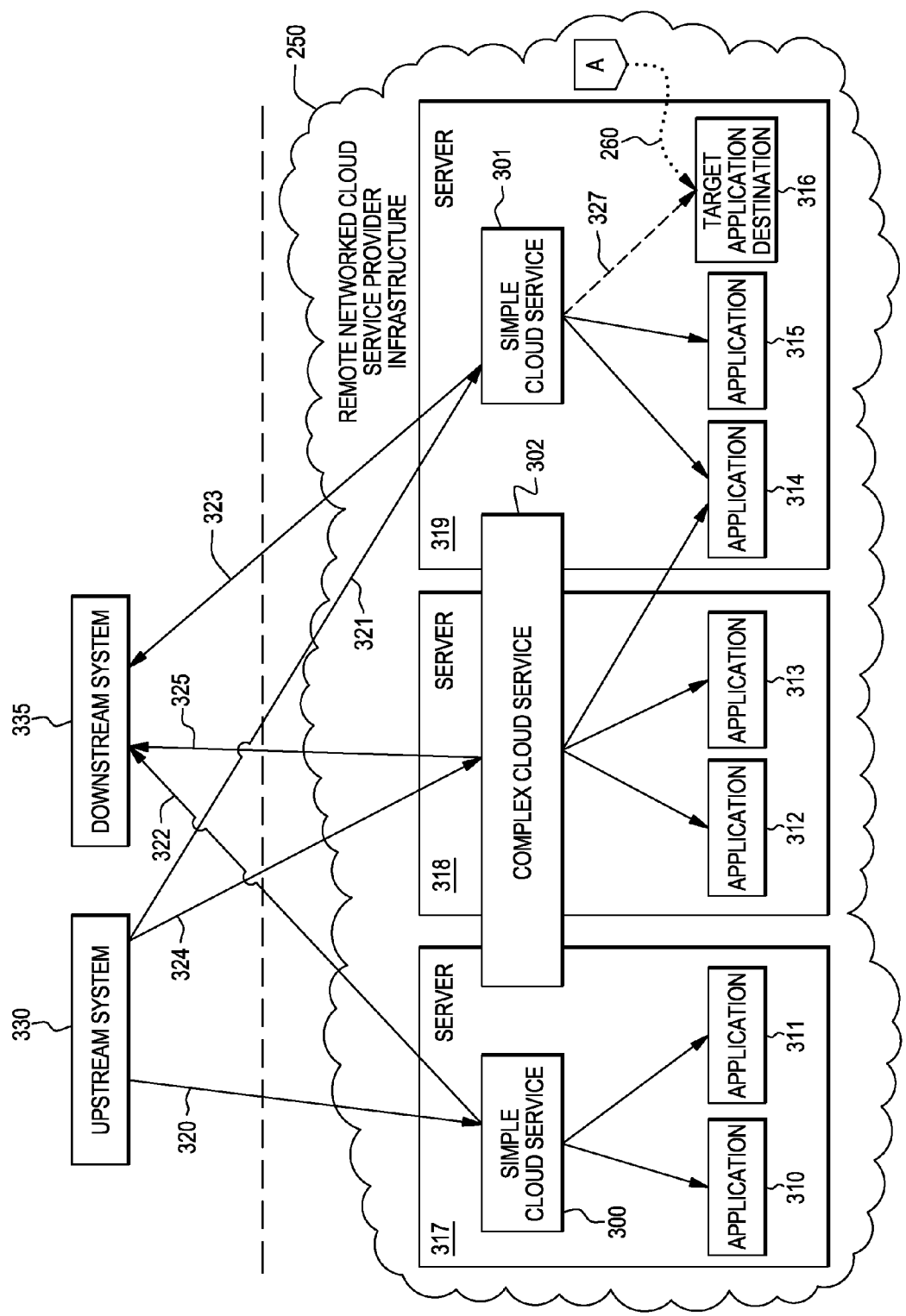

Referring now to FIG. 5B, illustrative remote networked cloud service provider infrastructure 250 is depicted, wherein candidate application 211 (shown in FIG. 5A) is migrated from a cloud server 217 (shown in FIG. 5A) to target application destination 316 on cloud server 319. A new network data connection 327 can be created to link candidate application 211 to simple cloud service 301, wherein application 211 would reside at target application destination 316 on cloud server 319. New network data connections are indicated by dashed lines, existing data connections are indicated by solid lines, and migration paths are indicated by dotted-lines. In the present embodiment, an application can be migrated in its entirety from a local networked cloud service provider to a remote networked cloud service provider. However, alternative embodiments can migrate component parts of candidate application 211 which can include: application state information, upstream network data connections, and downstream network data connections.

Remote networked cloud service provider infrastructure 250 can have a plurality of simple cloud services and complex cloud services. This embodiment includes simple cloud services 300 and 301 comprised of respective applications 310-311, applications 314-315, and a complex cloud service 302 comprised of applications 312-313 and 314. Simple cloud service 301 also includes new network data connection 327 to candidate application 211. Simple cloud services 300-301 can have respective upstream network data connections 320 and 321 for data output from upstream system 330, and respective downstream network data connections 322 and 323 for data input to downstream system 335. Also, complex cloud service 302 can have an upstream network data connection 324 for data output from upstream system 330 and a downstream network data connection 325 for data input to downstream system 335. In this particular embodiment, simple cloud service 300 utilizes applications 310-311 as well as upstream network data connection 320 linked to the upstream system 330. Similarly, complex cloud service 302 utilizes applications 312-313 and 314, and upstream network data connection 324 linked to the same upstream system 330.

In an alternative embodiment, application 211 is capable of performing operations comprising, for example, functions A, B, and C, but simple cloud service 200 (shown in FIG. 5A) may only require function A. In this alternative embodiment, application 211 can be migrated from local networked cloud service provider infrastructure 240 (shown in FIG. 5A) to remote networked cloud service provider infrastructure 250, wherein both networked cloud service provider infrastructures are owned by a single business entity. After migration of application 211 to infrastructure 250, application 211 may still perform function A for simple cloud service 200, while also performing functions for a cloud service residing in remote network cloud service provider infrastructure 250.

In yet another embodiment, application 211 can perform operations comprising, for example, functions A, B, and C, and simple cloud service 200 may have only required function A in the past, but now no longer requires function A. Thus, application 211 can be migrated in its entirety from local networked cloud service provider infrastructure 240 to remote networked cloud service provider infrastructure 250, wherein networked cloud service provider infrastructures are owned by different business entities.

In yet another embodiment, application 211 may need more CPU or disk space to perform operations comprising, for example, functions A, B, and C. Simple cloud service 200 may have only required function A, but no longer requires function A. However, application 211 may also have interdependencies with application 210, such that application 211 cannot be migrated without application 210. Thus, in this embodiment, applications 210-211 together with simple cloud service 200 could be migrated as a group from infrastructure 240 to infrastructure 250 in order to preserve the interdependencies between applications 210 and 211, preserve relationships between simple cloud service 200 and application 210, wherein infrastructure 240 and 250 are owned by either different business entities or a single business entity.

Figure 6:
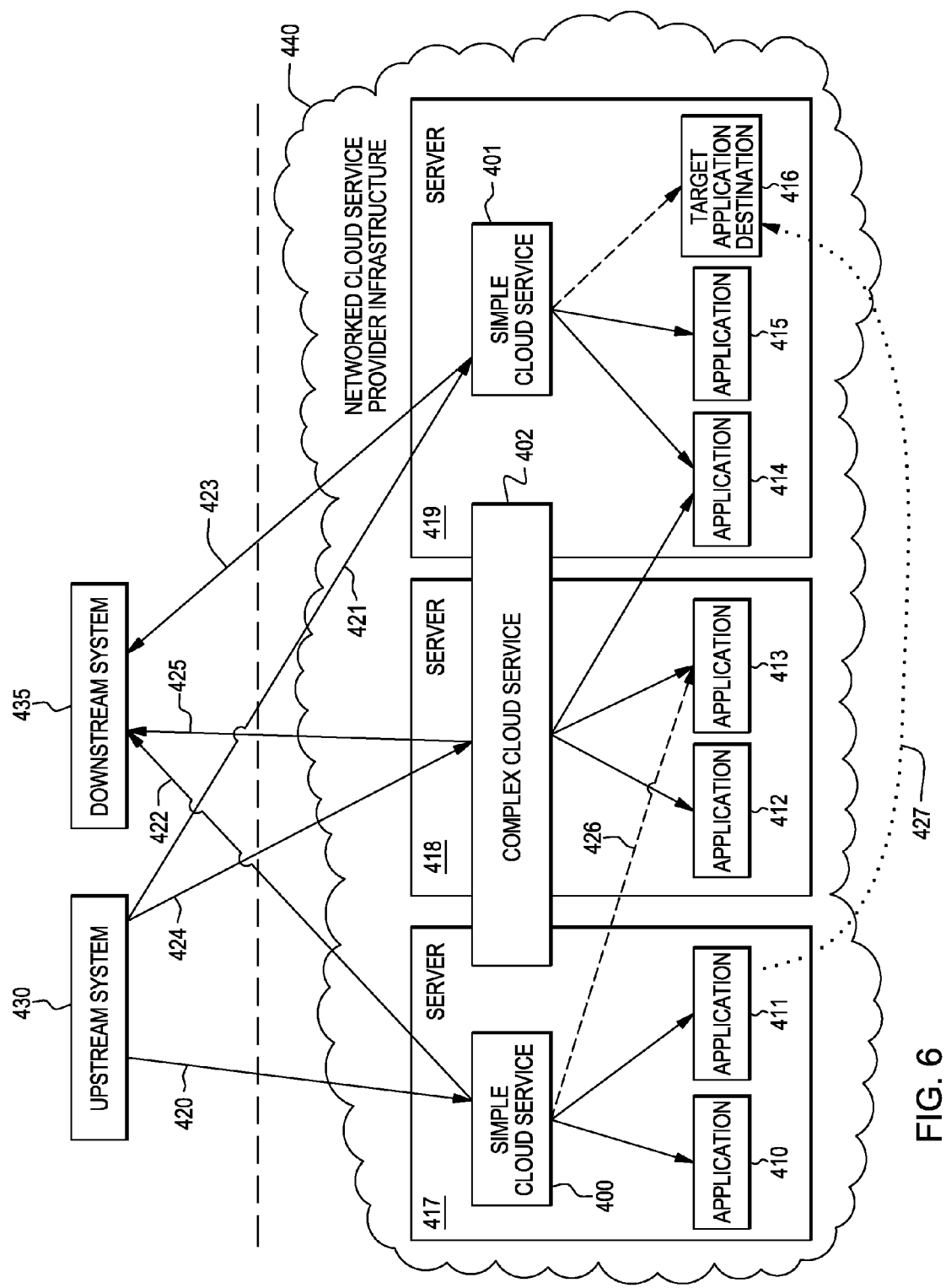
FIG. 6 depicts an intra-cloud migration of an application within a networked (e.g. cloud) service provider infrastructure.

FIG. 6 is a detailed view of a networked cloud service provider infrastructure 440, wherein application 411 is migrated in its entirety from a cloud server 417 to cloud server 419 via dotted-line path 427. Migration paths are indicated by dotted-lines. The networked cloud service provider infrastructure 440 can have a plurality of simple cloud services and complex cloud services. This embodiment includes simple cloud services 400 and 401 comprising respective applications 410-411 and applications 414-415 and target application destination 416, and complex cloud service 402 comprising of applications 412-413 and 414. Complex cloud service 402 spans cloud servers 418 and 419.

The simple cloud services 400 and 401 can have respective upstream network data connections 420 and 421 for data output from upstream system 430, and respective downstream network data connections 422 and 423 for data input to downstream system 435. Also, complex cloud service 402 can have an upstream network data connection 424 for data output from upstream system 430 and a downstream network data connection 425 for data input to downstream system 435. Upstream network data connections are external connections into networked cloud service provider infrastructure 440, which receive data for simple cloud services and/or complex cloud services. Downstream network data connections are any external connections out of the networked cloud service provider infrastructure 440, which send data from the simple cloud services and/or complex cloud services.

In this particular embodiment, simple cloud service 400 utilizes applications 410 and 411, as well as upstream network data connection 420 linked to the upstream system 430. Similarly, complex cloud service 402 utilizes applications 412-413 and 414, as well as upstream network data connection 424 linked to upstream system 430. In the present embodiment, applications 411 and 413 implement substantially the same functionality. An example of such functionality, implemented by application 411 and 413, could be a credit card processing application function. Here, application 411 has been identified as a candidate application for migration to cloud server 419 within networked cloud service provider infrastructure 440, the same cloud infrastructure in which it presently resides. Accordingly, it may be possible to substitute, the functionality of application 413 for application 411, by using new network data connection 426. New network data connections are indicated by dashed lines, and existing data connections are indicated by solid lines. As shown by dotted-line path 427, application 411 can be migrated within networked cloud service provider infrastructure 440 from cloud server 417 to target application destination 416 on cloud server 419, with minimal impact on simple cloud service 400 being able to meet service level requirements. However, in this embodiment if application 413 is substituted for application 411, then simple cloud service 400 will become a complex cloud service. Minimal impact can be achieved by leveraging the relationships and dependencies, that are generated by the deductive logic method or generated manually by cloud administrator 140 (shown in FIG. 4), along with service level requirements to determine whether to migrate the candidate application 411 to target application destination 416. In yet another embodiment, application 411 may also have interdependencies with 410. Thus, if substitute applications that reside on cloud server 418 are found for applications 410-411, then both applications 410-411 can be migrated as a subset of a group from cloud server 417 to cloud server 419.

In an alternative embodiment, application 411 is capable of performing operations comprising, for example, functions E, F, and G, but simple cloud service 400 may only require function E. In this alternative embodiment, state information of applications and upstream and downstream network connection information of application 411 can be migrated in parts from cloud server 417 to cloud server 419, wherein both cloud servers 417 and 419 reside in networked cloud service provider infrastructure 440. Moreover, after migration of upstream and downstream application information from server 417 to server 419, application 411 may still perform function E for simple cloud service 400, and application 411 may also perform functions for a simple cloud service 401 residing on cloud server 419.

Figure 7:
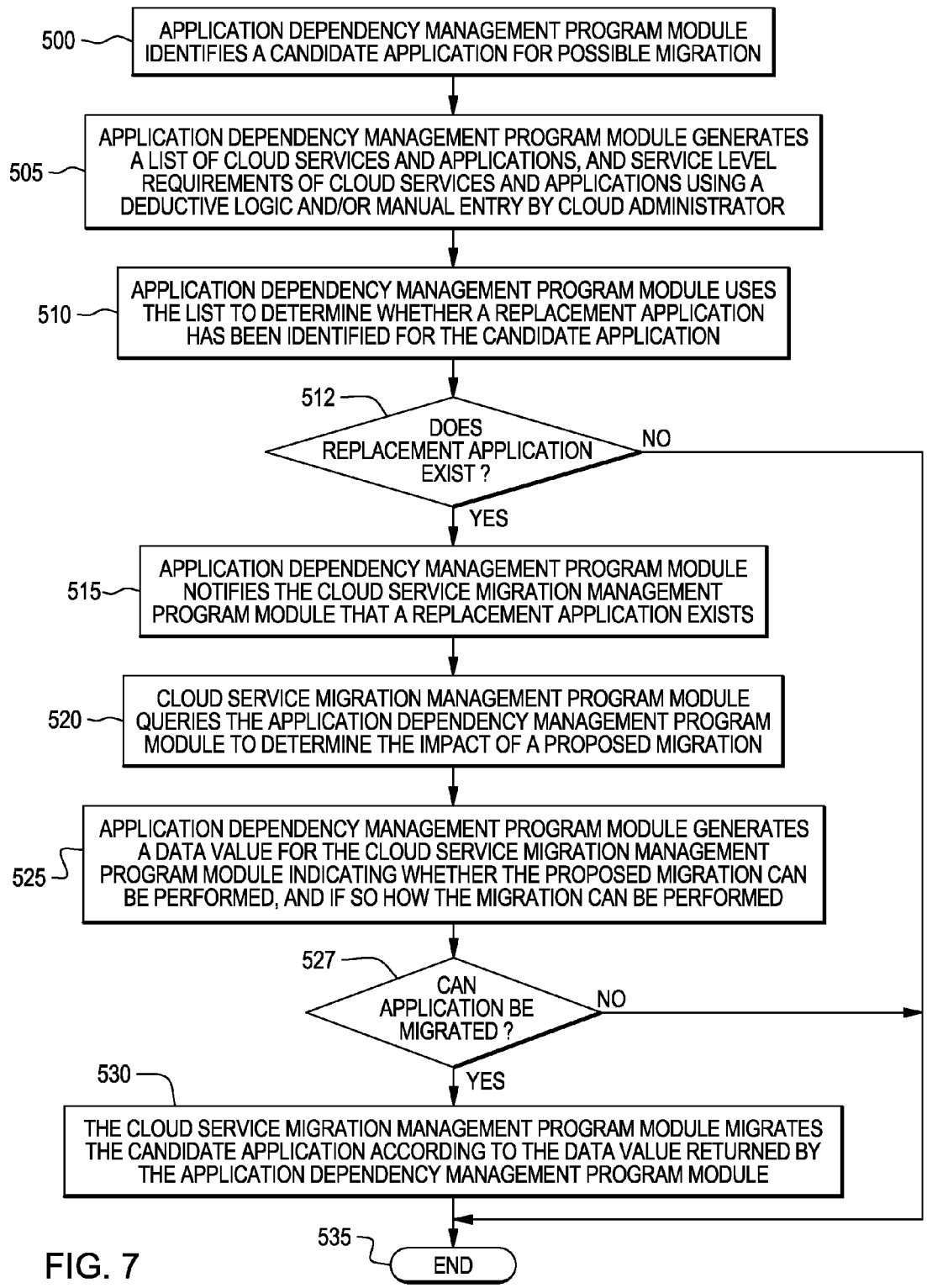
FIG. 7 depicts a method flow diagram according to an embodiment of the present invention.

Referring now to FIG. 7, a method flow diagram according to an embodiment of the present invention is shown. In step 500, the application dependency migration management program module identifies a candidate application 211 (shown in FIG. 5A) for possible migration. The application dependency management program module 65 (shown in FIG. 3) identifies the candidate application 211 for various reasons which include state information of application 211 or other applications within infrastructure 240 (shown in FIG. 5A), whether the candidate application 211 needs more CPU and disk capacity, ability of networked computer servers to execute one or more current applications and fulfill requirements of a service level agreement if candidate application 211 is migrated, measured performance of a substantially identical function of a replacement application, relationships and dependencies of application 211, and upstream and downstream network data connections of candidate application 211.

Once the candidate application 211 is identified, then in step 505, the application dependency management program module 65 (shown in FIG. 3) can discover relationships and dependencies of application 211 and generate an application relationship and dependency list by using a deductive logic method. The list could also include service level requirements. To generate the list by the deductive logic method the application dependency management program module 65 can connect to a network monitor to determine data flow. Examples of network monitors are sniffers or packet scanners. Next, as part of the deductive logic method, the application dependency management program module 65 captures information which includes the source, destination, and direction and type of network flow with respect to an application being considered for migration. Then, the application dependency management program module 65 can determine relationships and dependencies based on the captured information.

Alternatively, application dependency management program module 65 may discover relationships and dependencies by connecting to the computers systems within a cloud infrastructure and requesting signature packages. Signature packages include a data file and a program module that reside on a computer system, and when the program module is queried the program module returns contents of the data file. The contents of the data file contain information that indicates the relationships and dependencies of cloud services residing on the computer system. The application dependency management program module 65 uses the relationships and dependencies to generate the application relationship and dependency list. The list can be updated on a periodic basis, and is used by the application dependency management program module 65 to determine whether a proposed application can be migrated. Alternatively, in step 505, a cloud administrator 140 (shown in FIG. 4) discovers and manually enters the application relationships and dependencies via computer-based portal 142 (shown in FIG. 4).

The application relationship and dependency list may be stored on a storage device in memory 28 (shown in FIG. 1). The application relationship and dependency list generated in step 505 by the application dependency management program module 65 and/or cloud administrator 140 comprises at least the following: relationships and dependencies of simple cloud services, relationships and dependencies of complex cloud services, relationships and dependencies of applications, and service level requirements of applications and cloud services.

In step 510, application dependency management program module 65 (shown in FIG. 3) uses the relationship and dependency list to identify whether a replacement application exists among the applications 210 and 212-213 (shown in FIG. 5A) within networked cloud service provider infrastructure 240 (shown in FIG. 5A) which can perform the same or similar functions as the candidate application 211 while maintaining at least the same level of service required by simple cloud service 201.

Application 213 is an example of a possible replacement application for the candidate application 211, which is being considered for migration. In step 512, the application dependency management program module makes a final determination as to whether a replacement application exists. If no replacement application exists, then application dependency management program module processes will end at step 535, and no application migration will occur. Otherwise, in step 515, the application dependency management program module 65 may notify the cloud service migration management program module 66 that a suitable replacement application has been identified. Then, in step 520 the cloud service migration management program module 66 queries the application dependency management program module 65 to determine the impact of an intra-cloud migration of the candidate application 211 within networked cloud service provider infrastructure 240, or the impact of an inter-cloud migration of the candidate application 211 to remote networked cloud service provider infrastructure 250. The application dependency management program module 65 can determine the impact of either the inter-cloud migration or the intra-cloud migration by considering data which include the magnitude of communication delays associated with a proposed location where the candidate application 211 would reside, and also by considering whether application 211 and simple cloud service 200 can still meet service level agreements subsequent to a migration.

The migration impact can be determined before, or after a proposed migration is performed. If the impact is determined before the proposed migration is performed, then the magnitude of communication delays are estimated and used together with the service level requirements to test and simulate effects of the proposed migration. However, if the impact is determined after the proposed migration, the cloud service migration management program module will monitor the candidate application 211 after it has been migrated, and could reverse the migration and reintegrate application 211 into simple cloud service 201 in networked cloud service provider infrastructure 240 (shown in FIG. 5A), or integrate application 211 with a different cloud service residing in another networked cloud service provider infrastructure that allows application 211 to perform at a level that is comparable to the service provided prior to migration.

In step 525, using the relationship and dependency list stored in memory 28 the application dependency management program module 65 could return a data value to the cloud service migration management program module 66 indicating whether the application can be migrated alone, migrated as a group with other interdependent applications, migrated only with a portion of interdependent applications, or not migrated at all. The data value returned is generated by determining how far a service level threshold might be exceeded. In one or more preferred embodiments, the threshold is determined based on service level requirements, and would represent the probability of not being able to satisfy the underlying service level agreements. In step 527, the cloud service migration management program module 66 makes a final determination as to whether a candidate application can be migrated based on the data value received from program module 65. If candidate application 211 cannot be migrated under any circumstances, the application will remain in the same networked cloud service provider infrastructure 240, and application dependency management program module 65 processes will end at step 535. Otherwise, in step 530, based on the data value returned by the application dependency management program module 65, the candidate application 211 is migrated by the cloud service migration management program module 66 to a different server within the same networked cloud service provider infrastructure 240, or to a remote networked cloud service provider infrastructure 250. After the candidate application 211 has been migrated, both program modules 65 and 66 processes can end at step 535.

The flow and block diagram depicted in FIG. 7 illustrates the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While shown and described herein as a solution for managing distributed application relationships and dependencies, and application migrations in a networked computing environment, it is understood that the invention further provides various alternative embodiments. For example, in one embodiment, the invention provides a computer-readable/useable medium that includes computer program code to enable a computer infrastructure to provide functionality for managing distributed application relationships and dependencies, and application migrations in a networked computing environment as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide functionality for managing distributed application relationships and dependencies, and application migrations in a networked computing environment. In this case, the service provider can create, maintain, and support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for managing distributed application relationships and dependencies, and application migrations in a networked computing environment. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the term "program code" is any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/computer software program, component software or a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer implemented method for managing application migration in a networked computing environment, the method comprising the steps of:
generating a list of relationships and dependencies, via a computer implemented deductive logic method, associated with a first networked computing service and one or more current computer software applications utilized by the first networked computing service that is within a local cloud service provider infrastructure, wherein the list includes upstream and downstream network data connections of the first networked computing service;
storing the list on an electronic storage device;
determining an availability of one or more replacement computer software applications for the one or more current computer software applications that are utilized by the first networked computing service, wherein the one or more replacement computer software applications having at least the functionality as the one or more computer software applications;
determining an impact on service levels and performance of the first networked computing service that would result from at least one of an inter-cloud migration of the one or more current computer software applications to a remote cloud service provider infrastructure and an intra-cloud migration of the one or more current computer software applications within the local cloud service provider infrastructure, wherein the one or more current computer software applications migrate from the first networked computing service to a second networked computing service, based upon the list and the availability of the one or more replacement computer software applications;
migrating the one or more current computer software applications from the first networked computing service to the second networked computing service; and
receiving at least the functionality from the one or more replacement software applications, wherein the migration of the one or more current computer software applications is reversible if an actual impact of the migration is greater than the determined impact.

2. The method of claim 1, wherein the step of generating the list further comprises an administrator defining the relationships and dependencies of the one or more current computer software applications, and the upstream and downstream network data connections of the first networked computing service.

3. The method of claim 1, wherein the step of generating the list further comprises logically deducing the application relationships and dependencies of the one or more current computer software applications, and the upstream and downstream network data connections of the first networked computing service.

4. The method of claim 1, wherein the step of determining the availability is performed by an application dependency management program module that utilizes data which include at least one of the following: ability of networked computer servers to execute the one or more current software applications, measured performance of the functionality of the one or more replacement computer software applications, relationships and dependencies of the one or more current computer software applications, and the upstream and downstream network data connections of the first networked computing service.

5. The method of claim 1, wherein the step of determining the impact is performed prior to a migration of the one or more current computer software applications, wherein the list of relationships and dependencies is used to determine an overall performance impact on the first networked computing service, and determine an impact on fulfilling requirements of a service level agreement.

6. The method of claim 5, wherein a service migration management program module is signaled whether to migrate the one or more current computer software applications based on the determined impact.

7. The method of claim 6, wherein the impact further indicates whether the one or more current computer software applications can be migrated as a group, as a subset of a group, in whole, in parts, or not at all.

8. A system for managing application migration in a networked computing environment, the system comprising:
- a bus;
- a processor coupled to a bus;
- a memory medium coupled to the bus, the memory medium comprising instructions to:
- generate a list of relationships and dependencies, via a computer implemented deductive logic method, associated with a first networked computing service and one or more current computer software applications utilized by the first networked computing service that is within a local cloud service provider infrastructure, wherein the list includes upstream and downstream network data connections of the first networked computing service;
- store the list on an electronic storage device;
- determine an availability of one or more replacement computer software applications for the one or more current computer software applications that are utilized by the first networked computing service, wherein the one or more replacement computer software applications having at least the functionality of the one or more computer software applications;
- determine an impact on service levels and performance of the first networked computing service that would result from at least one of an inter-cloud migration of the one or more current computer software applications to a remote cloud service provider infrastructure and an intra-cloud migration of the one or more current computer software applications within the local cloud service provider infrastructure, wherein the one or more current computer software applications migrate from the first networked computing service to a second networked computing service, based upon the list and the availability of the one or more replacement computer software applications; and
- migrate the one or more current computer software applications from the first networked computing service to the second networked computing service such that at least the functionality from the one or more replacement software applications is received, wherein the migration of the one or more current computer software applications is reversible if an actual impact of the migration is greater than the determined impact.

9. The system of claim 8, wherein the step of generating the list further comprises an administrator defining the relationships and dependencies of the one or more current computer software applications, and the upstream and downstream network data connections of the first networked computing service.

10. The system of claim 8, wherein the step of generating the list further comprises logically deducing the application relationships and dependencies of the one or more current computer software applications and the upstream and downstream network data connections of the first networked computing service.

11. The system of claim 8, wherein the step of determining the availability is performed by an application dependency management program module that utilizes data which include at least one of the following: ability of networked computer servers to execute the one or more current software applications, measured performance of the functionality of the one or more replacement computer software applications, relationships and dependencies of the one or more current computer software applications, and the upstream and downstream network data connections of the first networked computing service.

12. The system of claim 8, wherein the step of determining the impact is performed prior to a migration of the one or more current computer software applications, wherein the list of relationships and dependencies is used to determine an overall performance impact on the first networked computing service, and determine an impact on fulfilling requirements of a service level agreement.

13. The system of claim 12, wherein a service migration management program module is signaled whether to migrate the one or more current computer software applications based on the determined impact.

14. The system of claim 13, wherein the impact further indicates whether the one or more current computer software applications can be migrated as a group, as a subset of a group, in whole, in parts, or not at all.

15. A computer program product for managing application migration in a networked computing environment, the computer program product comprising a non-transitory computer readable storage media, and program instructions stored on the non-transitory computer readable storage media, to:
- generate a list of relationships and dependencies, via a computer implemented deductive logic method, associated with a first networked computing service and one or more current computer software applications utilized by the first networked computing service that is within a local cloud service provider infrastructure, wherein the list includes upstream and downstream network data connections of the first networked computing service;
- store the list on an electronic storage device;
- determine an availability of one or more replacement computer software applications for the one or more current computer software applications that are utilized by the first networked computing service, wherein the one or more replacement computer software applications having at least the functionality of the one or more computer software applications;
- determine an impact on service levels and performance of the first networked computing service that would result from at least one of an inter-cloud migration of the one or more current computer software applications to a remote cloud service provider infrastructure and an intra-cloud migration of the one or more current computer software applications within the local cloud service provider infrastructure, wherein the one or more current computer software applications migrate from the first networked computing service to a second networked computing service, based upon the list and the availability of the one or more replacement computer software applications; and
- migrate the one or more current computer software applications from the first networked computing service to the second networked computing service such that at least the functionality from the one or more replacement software applications is received, wherein the migration of the one or more current computer software applications is reversible if an actual impact of the migration is greater than the determined impact.

16. The computer program product of claim 15, wherein the step of generating the list further comprises an administrator defining the relationships and dependencies of the one or more current computer software applications, and the upstream and downstream network data connections of the first networked computing service.

17. The computer program product of claim 15, wherein the step of generating the list further comprises logically deducing the application relationships and dependencies of the one or more current computer software applications and the upstream and downstream network data connections of the first networked computing service.

18. The computer program product of claim 15, wherein the step of determining the availability is performed by an application dependency management program module that utilizes data which include at least one of the following: ability of networked computer servers to execute the one or more current software applications, measured performance of the functionality of the one or more replacement computer software applications, relationships and dependencies of the one or more current computer software applications, and the upstream and downstream network data connections of the first networked computing service.

19. The computer program product of claim 15, wherein the step of determining the impact is performed prior to a migration of the one or more current computer software applications, wherein the list of relationships and dependencies is used to determine an overall performance impact on the first networked computing service, and determine an impact on fulfilling requirements of a service level agreement.

20. The computer program product of claim 19, wherein a service migration management program module is signaled whether to migrate the one or more current computer software applications based on the determined impact.

21. The computer program product of claim 20, wherein the impact further indicates whether the one or more current computer software applications can be migrated as a group, as a subset of a group, in whole, in parts, or not at all.

\* \* \* \* \*